United States Patent [19]
Cornillault

[11] 3,967,114
[45] June 29, 1976

[54] DEVICE FOR DETERMINING THE PROFILE OF A SURFACE

[75] Inventor: Jean Cornillault, Montlhery, France

[73] Assignee: Compagnie Industrielle des Lasers, Marcoussis, France

[22] Filed: Dec. 19, 1974

[21] Appl. No.: 534,396

[30] Foreign Application Priority Data
Jan. 10, 1974 France .......................... 74.00766

[52] U.S. Cl. .............................. 250/236; 250/572; 356/120; 356/209
[51] Int. Cl.² ........................................... H01J 3/14
[58] Field of Search ........... 356/118, 120, 209, 212, 356/167; 250/225, 563, 572, 236

[56] References Cited
UNITED STATES PATENTS

| | | | |
|---|---|---|---|
| 3,016,464 | 1/1962 | Bailey | 356/167 |
| 3,481,672 | 12/1969 | Zoot | 356/167 |
| 3,589,815 | 6/1971 | Hosterman | 356/167 |
| 3,692,414 | 9/1972 | Hosterman et al. | 250/236 |
| 3,715,165 | 2/1973 | Smith | 356/120 |
| 3,790,287 | 2/1974 | Cuthbert et al. | 356/120 |
| 3,847,485 | 11/1974 | Zanoni | 356/118 |
| 3,866,038 | 2/1975 | Korth | 250/563 |

*Primary Examiner*—Alfred E. Smith
*Assistant Examiner*—D. C. Nelms
*Attorney, Agent, or Firm*—Sughrue, Rothwell, Mion, Zinn & Macpeak

[57] ABSTRACT

A device for determining the profile of a surface is disclosed. It comprises a beam arranged in a rotating plane about an axis of rotation, forming on the surface a light spot and scanning a sector of that plane. A detection system whose detection axis is situated in that plane cuts the beam near the surface and a system for measuring the angle formed by the axis of detection and the beam during the scanning when the light spot is situated on the detection axis is utilized.

4 Claims, 3 Drawing Figures

DEVICE FOR DETERMINING THE PROFILE OF A SURFACE

BACKGROUND OF THE INVENTION

1. Field of the Invention

The present invention relates to devices for determining the profile of a surface and more particularly devices for determining the profile of the surface of a road or of a tunnel.

2. Prior Art

A device for determining the profile of a surface, comprising a source of a beam forming, on that surface, a light spot, means for that spot to move on the surface and a detection system whose axis cuts the beam in the vicinity of the surface to define a reference level, is known. The detection system comprises a photomultiplier tube of the type called a "scanning" tube, that is, comprising means for the electronic scanning of its receiving surface and on the other hand, a lens for forming an image of the spot on that receiving surface. The device further comprises, means for determining, by a measuring of the scanning time, the distance of the image from the centre of the receiving surface, that distance being representative of the difference between the light spot and the reference level.

That device has the disadvantage of being fairly inaccurate. Indeed, it is not possible to effect a sufficient number of measurements on a given surface, mainly because the photomultiplier scanning tubes have low resolution and scanning frequency characteristics.

The aim of the present invention is to overcome that disadvantage.

SUMMARY OF THE INVENTION

The present invention has as its object a device for determining the profile of a surface, that device comprising a source comprising a light generator for setting up a beam forming on that surface a light spot.

A detector system comprising a lens and a photosensitive element is arranged in the focal plane of that lens to provide an output signal when that lens forms the image of the said spot on that photosensitive element, that detector system defining a detection axis cutting the said beam.

Means for driving the beam and the said detection axis in a rotating movement respectively about a first axis of rotation and a second axis of rotation are utilized, each of these axes cutting that beam and that detection axis, so that this beam and this detection axis remain in a same plane.

The source comprises, means for the beam to scan an angular sector of the same plane, the scanning speed being high in relation to that of the rotation of the beam and of the said axis of detection. The source further includes means for measuring the angle formed by the beam and the detection axis at the instant when the said output signal is provided by the photosensitive element.

BRIEF DESCRIPTION OF THE DRAWINGS

The present invention will be better understood from the following description, given with reference to the accompanying drawing by way of illustration, in which.

DESCRIPTION OF THE PREFERRED EMBODIMENTS

Figure 1:
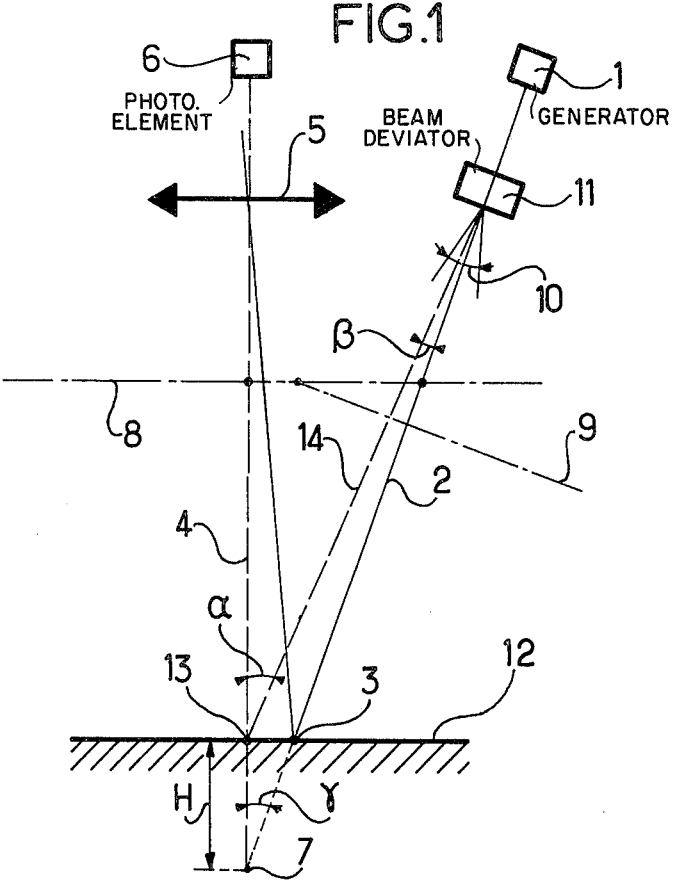
FIG. 1 is the operating diagram of the device according to the invention.

The device shown in FIG. 1 comprises a generator 1 of a light beam 2 directed towards a surface whose profile is to be determined; the axis of the beam 2 cuts the surface at 3 so that this beam forms a light spot on that surface. That device comprises, moreover, a detector system formed by a lens 5 and by a photosensitive element 6 placed at the focus of that lens. That detector system defines a detection axis 4 which cuts the beam 2 at a point 7 situated near the surface. The device comprises, moreover, means for making, on the one hand, the beam 2 rotate about an axis of rotation 9 cutting the beam 2 and the axis 4 and, on the other hand, the axis 4 rotate about an axis of rotation 8 also cutting the beam 2 and the axis 4. The rotation of the beam 2 and of the axis 4 is effected so that this beam and this axis remain at each instant in a same plane which, in the position shown, is the plane of FIG. 1.

The device comprises also means for the beam 2 to scan a sector 10 of that plane, these means contingently comprising, for example, a beam deviator 11. During the scanning, the spot formed by the beam on the surface describes a part of the trace 12 of that plane on that surface. When the beam passes through the intersection point 13 of the trace 12 with the axis 4, its axis 14 forms an angle $\alpha$ with the axis 4 and the lens 5 forms, on the photosensitive element 6, the image of the light spot of the beam on the surface. As the distance from the point 7 to the axis 8 is constant and the arrangement of the beam 2 in relation to the axis 4 is perfectly defined, the angle $\alpha$ is representative of the distance H between the point 7 and the point 13. That device comprises means for measuring the angle $\alpha$. These means may be means for measuring the angle $\beta$ between the beam 2 and the axis 14. Indeed, the angle $\beta$ is equal to the angle $\alpha$ plus a constant value, since, if $\gamma$ is the constant angle between the beam 2 and the axis 4, the result obtained is:

$$\alpha = \beta + \gamma.$$

The device shown in FIG. 1 operates as follows. During the rotation of the beam 2 and of the axis 4 respectively about axes 9 and 8, the point 7 describes a reference curve and the point 13 describes a profile of the surface to be examined. The determining of that profile consists in measuring the distance H between the reference curve and various points of that profile, that is, as has been described above, in measuring the value of the angle $\alpha$ or of the angle $\beta$ during the scanning of the sector 10 by the light beam. The speed of that scanning is preferably very much greater than the speed of rotation of the beam 2 and of the axis 4 in order to be able to effect a great number of measuring points during a rotation of the beam.

The device shown in FIG. 1 is particularly suited to the determining of the profile of a tunnel. In that case, the axes 8 and 9 merge, to great advantage, for example along the axis 8 and the axis 4 is perpendicular to the axis 8 itself pointing in a direction substantially parallel to the axis of the tunnel. During its rotation about the axis 8, the axis 4 describes a plane and the beam 2 describes a cone of revolution about the axis 8 ; the refernce curve is therefore a circle situated in a transversal plane of the tunnel. That device may be moved slowly along the tunnel in order to determine successively various transversal profiles.

But that device can also enable the determining of the profile of plane surfaces, for example the profile of a road. In that case, as illustrated, the axis 8 is perpendicular to the axis 4 and the axis 9 is perpendicular to the beam 2. During their rotations, the axis 4 and the beam 2 describe respectively two planes : the reference curve is therefore a straight line. The device may be arranged so that this straight line be directed parallel to the surface of the road, in a transversal plane of that road.

Figure 2:
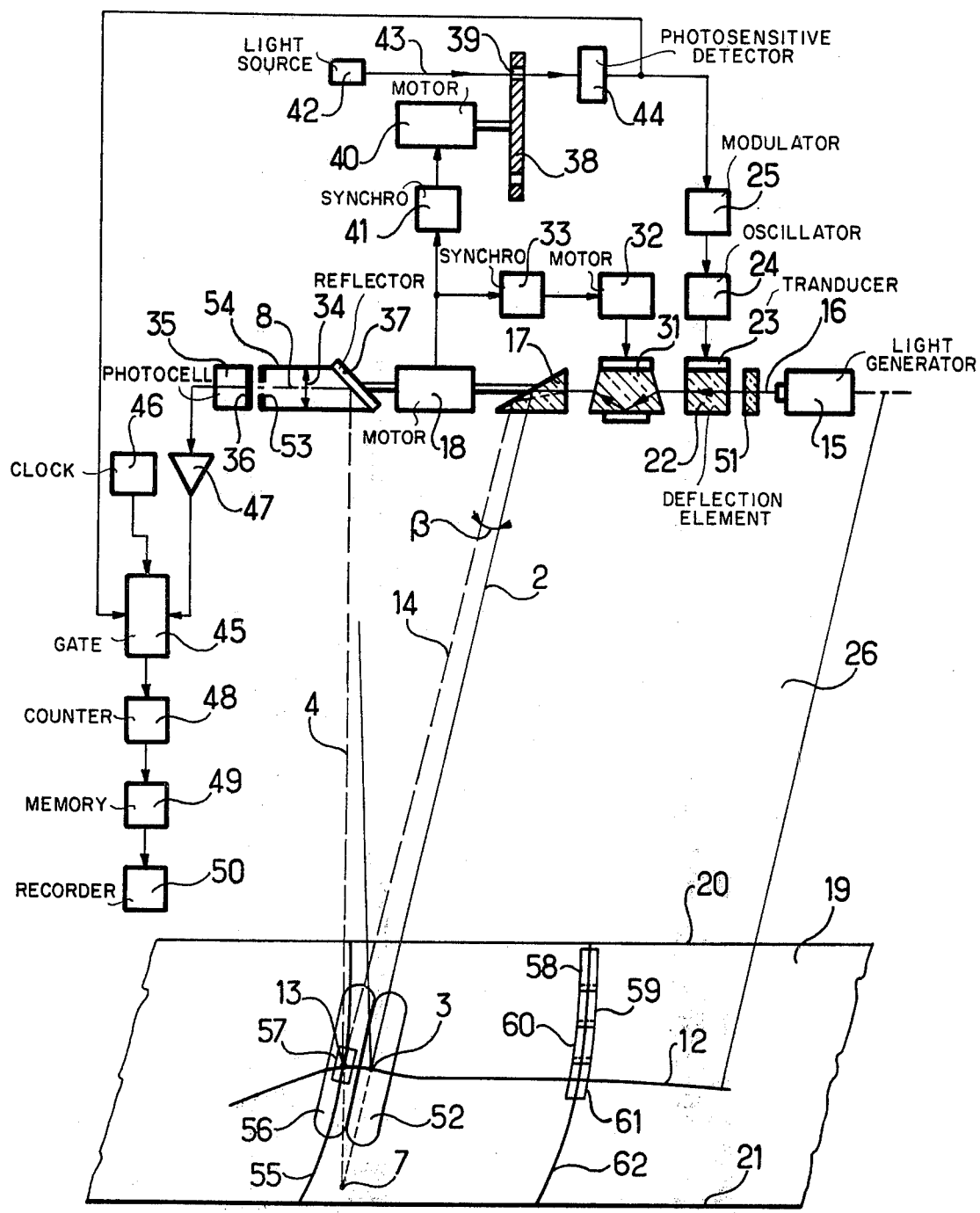
FIG. 2 is an embodiment, constituting an advantage, of a device according to the invention.

FIG. 2 shows a preferred embodiment of a device operating according to the principle set forth above. That device comprises a light generator such as a laser 15 emitting a beam 16 having a small cross-section towards a total reflection prism 17 driven in a rotating movement about an axis 8 by a motor 18. The prism 17 receives the light of the laser along the axis 8 and sends it back along a beam 2 whose axis cuts, at 3, a surface 19 of a tunnel assumed to be substantially cylindrical, that surface being limited in FIG. 2 by two generating lines 20 and 21 of the cylinder corresponding to that tunnel.

A deflection element is arranged on the path of the beam 16. That element may be, as shown in FIG. 2, an acoustico-optical cell formed by a block 22 of a modulating acoustico-optical substance and by an electrical electro-acoustic transducer 23. The input of that transducer is connected to the output of an oscillator 24 sending out an electric voltage at an acoustic frequency. The input of the oscillator 24 is connected to the output of a modulator 25, capable of modulating the frequency of the oscillator 24 according to predetermined program. The acoustico-optical cell is arranged in relation to the prism 17 so that the deflection of the laser beam takes place in the plane 26 passing through the axis 8 and the beam 2, that plane 26 being perpendicular to the face of the prism 17 on which the beam is reflected and cutting the surface 19 along a trace 12.

Figure 3:
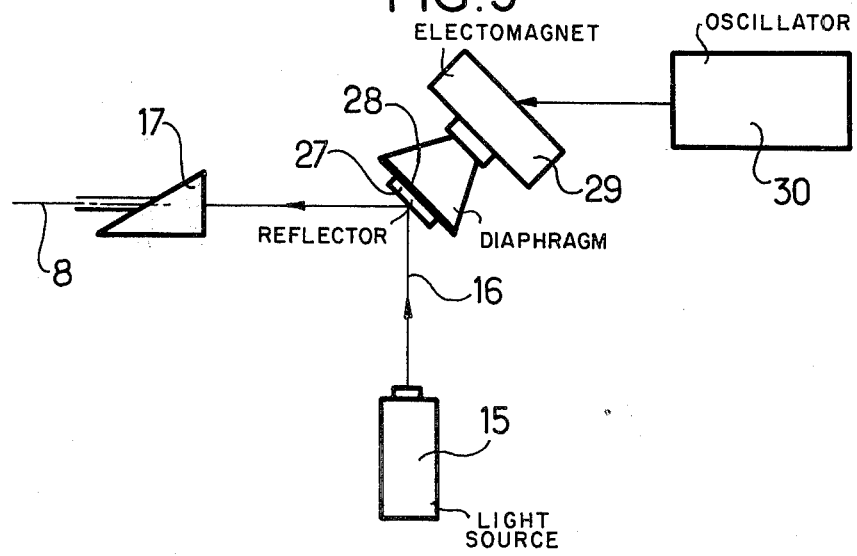
FIG. 3 is a variant of embodiment of a part of the device illustrated in FIG. 2.

The deflection element may also be a device shown in FIG. 3, comprising a reflector 27 arranged on the path of the beam 16, that reflector 27 being fixed on a diaphragm 28 of a loudspeaker, capable of vibrating under the action of an electromagnet 29 whose input terminals are connected to an oscillator 30.

A Dove prism 31 (FIG. 2) driven in a rotating movement about the axis 8 by a motor 32 whose speed is synchronized with that of the motor 18 by means of a synchronization device 33 is arranged between the deflection element and the prism 17 and on the path of the laser beam. In the case shown in FIG. 2, where that Dove prism is of the type enabling a single internal reflecting of the beam, the motor 31 rotates at a speed equal to half that of the motor 18.

The device shown in FIG. 2 comprises, moreover, a detector system formed by a lens 34 centred on the axis 8 and by a photosensitive cell 35 whose sensitive face 36 is placed in a focal plane of the lens 34. A reflector 37 whose plane is perpendicular to the plane 26 is arranged on the axis 8 on the same side as the other focal plane of the lens 34 to define a detection axis 4 cutting the beam 2 at a point 7 situated in the plane 26 near the surface 19, so that the light propagated along the axis 4 is reflected by the reflector 37 along the axis 8. The reflector 37 is mechanically coupled to the prism 17 and driven with it by the motor 18, the prism 17 and the reflector 37 being fixed respectively to the two ends of the shaft of the motor 18.

The device of FIG. 2 comprises, moreover, an angular encoder which comprises a disk 38 drilled with several openings 39 spaced out regularly on a circle centred on the axis of that disk. The disk 38 is driven in a rotating movement about its axis by a motor 40 at a speed synchronized with that of the motor 18 by means of a synchronization device 41. A light source 42 is arranged in the vicinity of the disk 38 for the light 43 which it emits to pass successively through the various openings 39 during the rotation of that disk. The light 43 is received by a photosensitive cell 44 which consequently emits, during the rotation of the disk 38, electric start signals representative of discreet and predetermined angular positions of the beam 2. The output of the cell 44 is connected to the input of the modulator 25 or of the oscillator 30 in the embodiment shown in FIG. 3.

The output of the cell 44 is also connected to an input of a gate 45 connected to the output of a clock 46. Another input of the gate 45 is connected to the output of the cell 35 through an amplifier 47. A counter 48 is connected to the output of the gate 45. The output of the counter 48 is connected to the input of a memory 49 whose output may be connected to the input of a display system such as a recorder 50.

To great advantage, a cylindrical lens 51 may be arranged directly at the output of the laser generator 15 so as to impart to the light spot 52 formed by the beam 2 on the surface 19 a transversally elongated shape in relation to the plane 26.

When the sensitive surface 36 of the cell 35 is relatively large, it is necessary to provide a diaphragm 53 centred on the axis 8. If the device comprises a cylindrical lens such as the lens 51, the diaphragm 53 is, to great advantage, provided with a rectangular opening directed transversally in relation to the plane 26. The diaphragm 53 is then driven in a rotating movement about the axis 8 by the motor 18, due, for example, to a housing 54 mechanically connecting that diaphragm and the reflector 37.

The device shown in FIG. 2 operates as follows:

The beam 2 and the axis 4 contained in the plane 26 rotate about the axis 8 under the effect of the motor 18 driving the prism 17 and the reflector 37. During the rotation, the point 7 describes a reference circle and the point of intersection 13 of the surface 19 with the axis 4 describes a profile 55. It is required to determine the radial distance of various points such as 13 of the profile 55 in relation to the reference circle.

As soon as the cell 44 emits a start signal, the acoustico-optical cell 22–23 is energized and the laser beam which crosses through it is deviated by an angle whose value is proportional to the modulated frequency sent out by the oscillator 24. That deviated laser beam is reflected by the prism 17. The Wollaston prism 31 has the effect of maintaining the reflected beam in the plane 26 during the rotation about the axis 8. The Dove prism may have a relatively small dimension, as the laser beam which passes through it generally has a small cross-section. Due to the acoustico-optical cell, the beam reflected by the prism 17 scans a sector of the plane 26. During that scanning, its axis which is in the position 14 passes through the point 13.

The determining of the distance between the points 7 and 13 consists, as has been seen in the description of the device illustrated in FIG. 1, in measuring the angle β formed by the non-deviated beam 2 and the axis 14. For that purpose, the time which passes during the scanning between the instant when the laser beam is in the position 2 and that when it is in the position 14, is measured.

The instant when the laser beam is in the position 2 corresponds to the emitting of the start signal emitted by the cell 44, that signal controlling the opening of the gate 45 which then allows the pulses emitted by the clock 46 to pass.

The instant when the laser beam is in the position 14 corresponds to the emitting of the output signal of the cell 35, that signal controlling the closing of the gate 45 which then ceases to allow the pulses of the clock 46 to pass.

The counter 48 registers the pulses sent out by the clock 46 between those two instants, this determining a time which is proportional to the value of the angle β and hence to the distance H between the points 7 and 13.

Due to the diaphragm 53 with a rectangular opening, the detector system selects a rectangle of light 57 on the light spot 56 formed by the beam whose axis is 14 on the surface 19. The rectangle 57 remains aligned in the direction of the profile 55 during the rotation of the motor 18 as the diaphragm 53 is coupled with the shaft of the motor 18.

The frequency of the start signals sent out by the angular encoder is chosen, to great advantage, big enough for the various rectangles of light corresponding to the successive measurements made on a predetermined profile to become partly covered, like the rectangles 58, 59, 60 and 61 arranged on the profile 62 extending between the generating lines 20 and 21. That arrangement has the advantage of enabling the scanning of all the points of a profile to be examined.

During the description of the devices illustrated by FIGS. 1 to 3, it has been seen that the device according to the invention for determining the profile of a surface does not comprise any photomultiplier scanning tube: the photosensitive cell 35 may be, for example, a normal photomultiplier tube, without scanning. That device has the advantage of enabling a great number of measuring points to be made on a given surface, since that number of measuring points is limited only by the frequency of the pulses sent out by the angular coder.

The device according to the invention for determining the profile of a surface may be applied to the checking of the profile of roads or tunnels.

I claim:

1. In a device for determining the profile of a surface comprising:
    a source comprising a light generator providing an optical beam, a controllable deflection element arranged to receive the light emitted from the said generator and a first deflector arranged to receive the light emerging from said deflection element and to reflect back that light according to the beam that forms a light spot on said surface;
    a detector system comprising a lens, a photosensitive element arranged in the focal plane of the lens to generate an output signal when said lens forms the image of said spot on the photosensitive element, the detector system defining a detection axis cutting said beam;
    means for driving the beam and said detection axis in a rotating movement about a common axis of rotation cutting both the beam and the detection axis, wherein the beam and the detection axis remain in a same plane, the source further comprising means to control said deflection element to scan an angular sector of the same plane, the scanning speed being greater than that of the rotation of the beam and the axis of detection;
    means for measuring the angle formed by the beam and the detection axis when said output signal is generated by the said photosensitive element, wherein the improvement comprises:
    a Dove prism arranged on the same axis of rotation between said deflection element and the first reflector and means for driving said Dove prism in a rotating movement;
    the detection system further comprising a second reflector arranged so that the light which propagates along the axis of detection is reflected back towards said lens along said same axis of rotation, said first and second reflectors being mechanically coupled together, their planes being respectively perpendicular to said same plane; and
    said means for driving the beam and the axis of detection about the same axis of rotation includes means for making said first and second reflectors rotate about the same axis of rotation at a speed synchronized with that of the Dove prism.

2. A device according to claim 1 wherein said deflection element includes an acoustico-optical cell through which the said optical beam passes, an acoustic frequency oscillator for energizing the said cell and means for modulating the frequency of said oscillator.

3. A device according to claim 1 wherein said means for measuring the angle formed by the beam and said axis of detection comprises an angular coder generating start signals which are representative of discrete and predetermined positions of the beam around the same axis of rotation, the output of the encoder connected to the input of the modulation means for initiating the modulation of the frequency of the oscillator; and, means for measuring the time passing between the generation of a start signal by the angular encoder and the emitting of the output signal supplied by the photosensitive element during the period of modulation.

4. A device according to claim 1 wherein said source comprises a cylindrical lens arranged at the output of the light generator to shape said optical beam into a light spot having an elongated shape transversally to the same plane.

* * * * *